No. 844,325. PATENTED FEB. 19, 1907.
F. B. BURNESS.
CEMENT TRUCK.
APPLICATION FILED SEPT. 4, 1906.
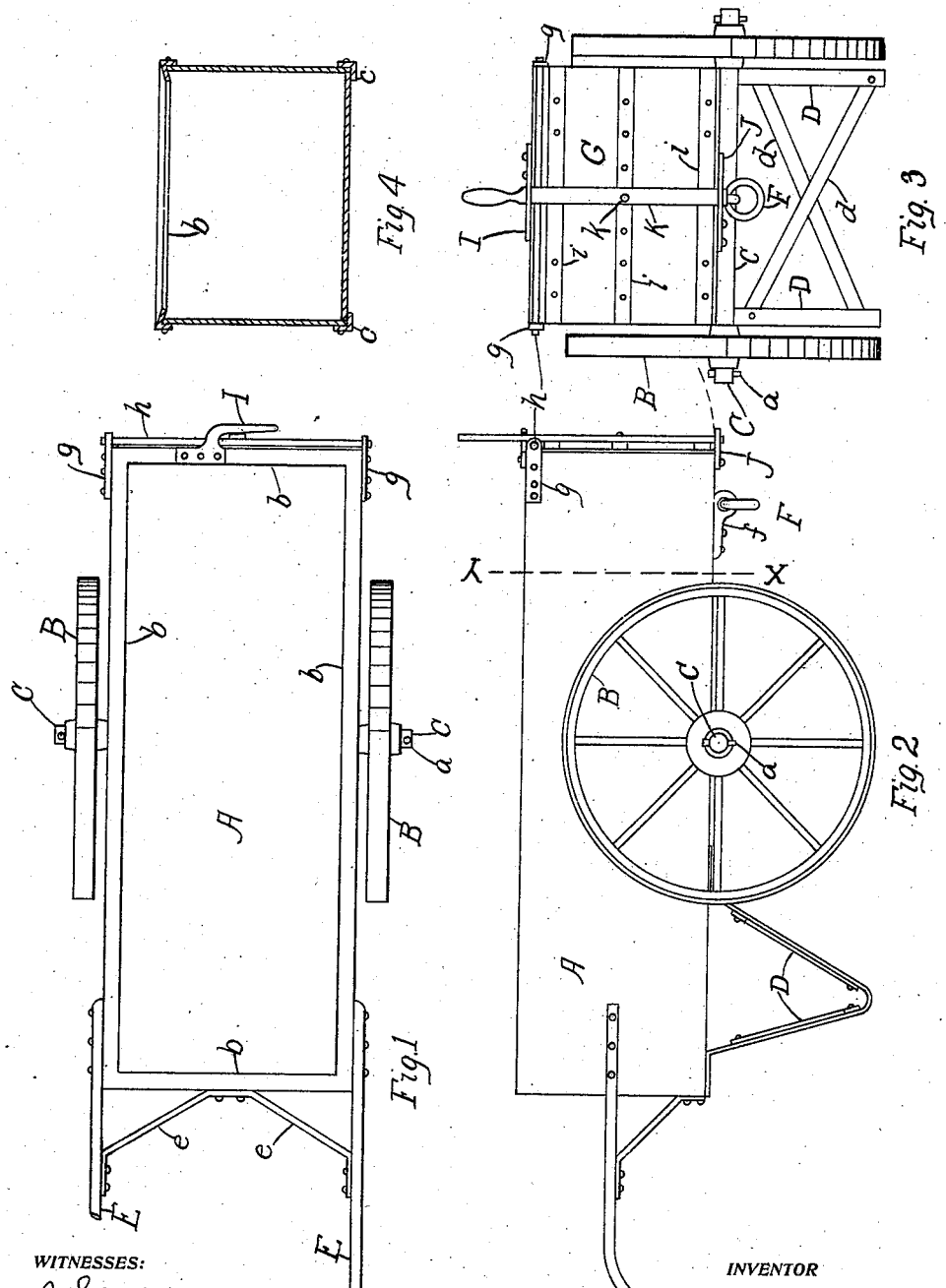
WITNESSES:
J. S. Nelson
Jno D Lynch
INVENTOR
F. B. Burness
BY
H. C. Gardiner
ATTORNEY

UNITED STATES PATENT OFFICE.

FRANK B. BURNESS, OF SIOUX CITY, IOWA.

CEMENT-TRUCK.

No. 844,325.   Specification of Letters Patent.   Patented Feb. 19, 1907.

Application filed September 4, 1906. Serial No. 333,251.

*To all whom it may concern:*

Be it known that I, FRANK B. BURNESS, a citizen of the United States, residing at Sioux City, in the county of Woodbury and State of Iowa, have invented a new and useful Improvement in Cement-Trucks, of which the following is a specification.

My invention relates to improvements in means for handling cement in the construction of buildings and sidewalks, and has for its object the provision of a truck or cart in which the cement may be carried to the desired place and dumped.

I have illustrated my invention in the accompanying drawings, in which—

Figure 1 is a plan view of my invention, and Fig. 2 a view in side elevation. Fig. 3 is an end view as seen from the rear, and Fig. 4 is a cross-section on line $xy$, Fig. 2.

Referring to the illustrations, in which like parts are designated by similar letters of reference, A is a rectangular box of ordinary shape mounted on wheels B B, which turn on the axis C, the wheels being held by means of the pins $a\ a$. To the upper inner edge of the box is secured a rim $b$, which projects inward and downward and prevents the cement from slopping or spilling over the sides. The outer lower corners of the box are reinforced by angle-irons $c\ c$, riveted firmly to the box. Near the forward end of the bottom of the box are secured the V-shaped legs D D, strengthened by the cross-braces $d\ d$. To the forward end of the box are secured the usual handles E E, braced by the cross-pieces $e\ e$. Near the rear of the bottom of the box is attached a ring F, pivotally secured to the box by the staple $f$. In carrying a heavy load up a steep incline it is sometimes necessary to attach a windlass or pulley, and the ring is provided in order that a rope may be attached for this purpose. The rear end or door of the box G is hinged at the top by means of the strips $g\ g$, secured to the upper edge of the sides and projecting over the end. The outer ends of the strips have each a round opening through which is run a rod $h$, which is secured to the upper edge of the door. The door is reinforced by bands $i\ i$, riveted to the door at proper intervals. Provision is made for firmly securing the door by means of the hooks I, secured to the rim $b$ and projecting over the door, and the hook J, secured to the bottom of the box and projecting outward, the points of the hooks projecting laterally in opposite directions, and the bar K, which is pivoted to the door at the center $k$, the ends fitting into the hooks. The upper part of the bar extends up from the box and forms a handle, and when the door is closed the ends of the bar fit within the hooks. When it is necessary to open the door, the handle is pushed toward the left, which releases the bar from the lower hook and permits the door to swing open. As the truck is dumped backward the cement presses against the door, pushing it open. The door being hinged at the top forms a guide for the cement as it pours out from the box and prevents it from spilling or flowing too rapidly, as the weight of the door rests partly upon the flowing cement. The box should be evenly balanced upon the axle in order to avoid unnecessary lifting when the box is filled.

The box and the various parts are made strong and reinforced in different places, as a very strong truck is needed to properly handle the heavy cement.

My invention is especially adapted for cement, but may readily be utilized for other similar purposes.

Having described my invention, what I claim as new, and desire to secure by Letters Patent, is—

In a portable truck the combination of a box mounted upon suitable wheels, a rim secured to the upper edge of the box and projecting inward and downward, angle-iron reinforcing the lower corners of the box, and a door at one end of the box hinged at the top and swinging outward, substantially as described.

In testimony whereof I hereby affix my signature in the presence of two witnesses.

FRANK B. BURNESS.

Witnesses:
  H. C. GARDINER,
  J. S. NELSON.